Nov. 12, 1929.                O. OLDHAM                1,735,782
                           BATTERY CABLE CLAMP
                           Filed May 21. 1928

Oliver Oldham,
                                                          INVENTOR
WITNESS:                             BY Victor J. Evans
                                                         ATTORNEY Patented Nov. 12, 1929

1,735,782

UNITED STATES PATENT OFFICE

OLIVER OLDHAM, OF BEDFORD, INDIANA, ASSIGNOR OF ONE-FOURTH TO CHARLES HARTLEY, OF BEDFORD, INDIANA

BATTERY CABLE CLAMP

Application filed May 21, 1928. Serial No. 279,494.

The primary object of this invention is to provide a battery connector of a construction whereby a cable may be attached to the pole or post of a battery in any easy and expeditious manner and likewise whereby the connector may be removed from the pole in a manner as easy as in which the same was secured thereon.

A further object is the provision of a battery cable clamp or connector constructed of brass or like metal which is not easily susceptible to corrosion and which includes a ring portion that merges into an exteriorly threaded stem having a socket for the cable, the said ring being slit angularly on one of its sides at its connection with the socket, the outer wall thus provided being flared as is the opposite wall, and these flared walls are designed to be frictionally engaged by a wall provided in the concaved end of a nut which is screwed on the stem, and whereby the split ring may be readily compressed to effectively sustain the same upon a battery pole or post when the nut is screwed home and further whereby the sections comprising the split ring will spread away from each other when the nut is unscrewed to permit the device being readily removed from the post or pole without employment of tools which are ordinarily employed for this purpose.

To the attainment of the above recited objects the invention consists in the improvement as hereinafter described and definitely claimed.

Figure 1:
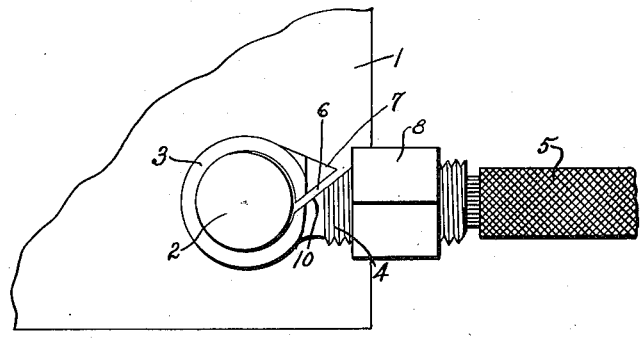
Figure 1 is a plan view of the improvement, showing the nut unscrewed.
Figure 2:
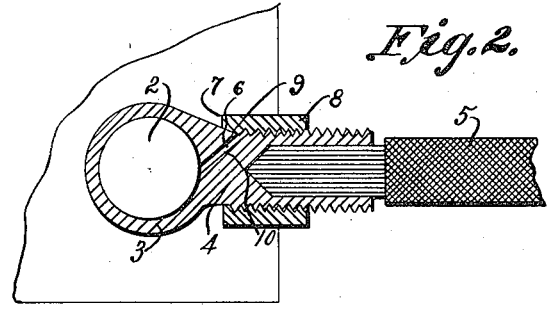
Figure 2 is a central horizontal sectional view through the improvement showing the nut screwed home.
Figure 3:
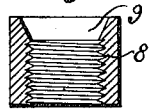
Figure 3 is a central longitudinal sectional view through the nut.

In the drawings, the numéral 1 designates a portion of a battery and 2 one of the posts or poles therefor.

My improvement contemplates the employment of a ring member 3 of spring metal which is not unduly susceptible to corrosion, such for instance, as brass. The ring is formed on one end of a cross sectionally rounded shank 4 and this shank has a socket entering from its end for the reception of a cable 5. The shank is exteriorly threaded, and the ring 3 is slitted angularly, as at 6, the said slit entering the shank. The outer wall at the slit end of the ring is flared or arranged angularly, as at 7, toward the shank. For distinction the wall 7 will be termed a shoulder.

There is screwed on the threaded shank 4 a nut 8, and this nut has what I will term its outer end concaved or flared, as at 9, the said portion 9 in the bore of the nut designed to ride over the shoulder 7 and to force the inner wall at the slit end of the ring into contact with the angle wall 10 of the ring and shank provided by the said slit 6.

By a simple arrangement as above described it will be noted that it is merely necessary to screw the nut 8 to force the walls provided by the normally spread ring into contact with each other and thereby effectively bind the ring on the pole or post 2. In a like manner it is merely necessary to unscrew the nut to permit the expansion of the split ring so that the clamp or connector can be readily removed from the pole or post 2. Should any corrosion occur between the parts a screw driver blade or the like may be inserted in the slit 6 to effectively spread the split ring. With my improvement it will be noted that the split ring is not provided with the usual lugs nor the bolt which is screwed through the lugs and that the device may be attached or removed in an easier and more expeditious manner than can be accomplished by the ordinary construction of battery clamps or connectors.

Having described the invention, I claim:

A battery connector comprising a round shank which is exteriorly threaded and which has a socket for the reception of a cable, said shank merging into a resilient ring and the shank and ring being slitted angularly to permit of the normal opening of the ring, a nut screwed on the shank and having an annular conical depression entering from one end and communicating with its bore to contact with the free end of the ring to compress the walls provided by the slit portion of the ring and shank against each other.

In testimony whereof I affix my signature.

OLIVER OLDHAM.